United States Patent [19]

Kantz

[11] 4,080,788

[45] Mar. 28, 1978

[54] SEPARATOR APPARATUS FOR DIFFERENTIAL HIGH PRESSURE SYSTEMS OF A STIRLING ENGINE

[75] Inventor: Don B. Kantz, Ferndale, Mich.

[73] Assignee: Ford Motor Company, Dearborn, Mich.

[21] Appl. No.: 702,645

[22] Filed: Jul. 6, 1976

[51] Int. Cl.² ............................................. F02G 1/04
[52] U.S. Cl. ..................................... 60/517; 137/192; 137/427; 184/6
[58] Field of Search .................. 137/192, 427; 184/6, 184/1 E, 6.21; 60/517

[56] References Cited

U.S. PATENT DOCUMENTS

| | | | |
|---|---|---|---|
| 1,642,023 | 9/1927 | Haight | 137/192 |
| 2,154,760 | 4/1939 | Long | 137/427 X |
| 2,760,596 | 8/1956 | Kellie | 137/192 X |
| 3,199,526 | 8/1965 | Pall | 137/192 |
| 3,203,245 | 8/1965 | Smallpeice | 137/192 X |

*Primary Examiner*—Allen M. Ostrager
*Attorney, Agent, or Firm*—Joseph W. Malleck; Olin B. Johnson

[57] ABSTRACT

An improved dividing assembly, useful in dividing the high pressure gas system from the lubricating system in a regenerative type Stirling engine, is disclosed. The closed thermally cycled gas system of a Stirling engine may vary between 20–200 atmospheres which complicates sealing and separation problems between fluid systems in the engine. One interface between said fluid occurs at the piston rods which reciprocate between an oil flushed environment within the driven assembly and the pure high pressure gas environment of the thermal cycling assembling. The two systems must be separated and yet allow access of each system to said rods. A piston rod sealing assembly is employed which uses a bleed of high pressure gas to (a) assist in forcing a tighter wiping of the piston rod surfaces, and (b) to convey wiped oil as a mixture away from the sealing assembly. A separator assembly is employed to reclaim substantially pure gas from said mixture and return separated oil to the oil system. A control periodically returns separated oil; the float element of the control withstands high pressures of the fluids worked upon by use of a condensate confining zone within the float and an intercommunication between such zone and the float exterior so that upon the occurrence of a pressure differential between the float interior and exterior, oil residue may be ejected and placed with oil separated by other filter or demisting means.

4 Claims, 5 Drawing Figures

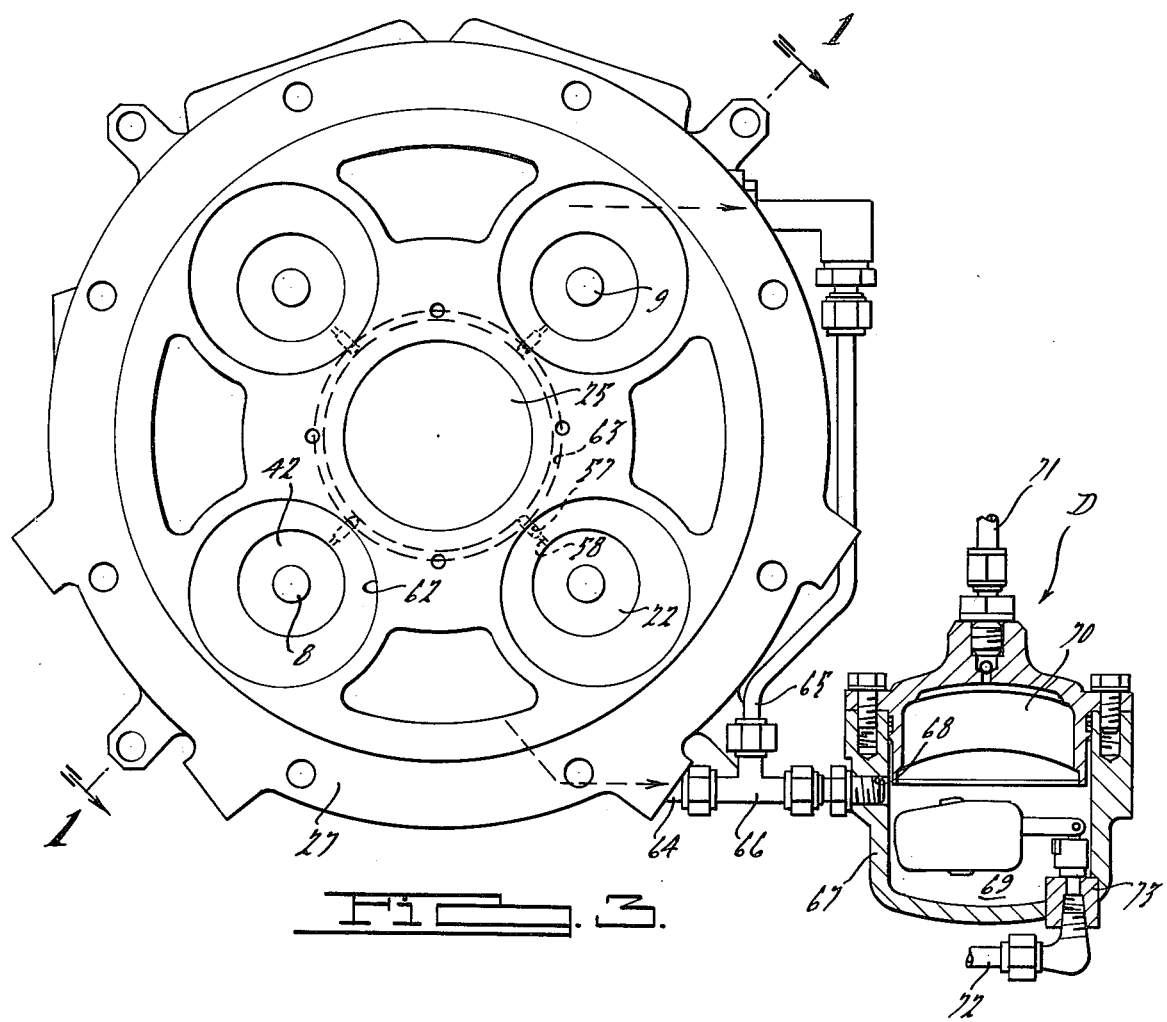
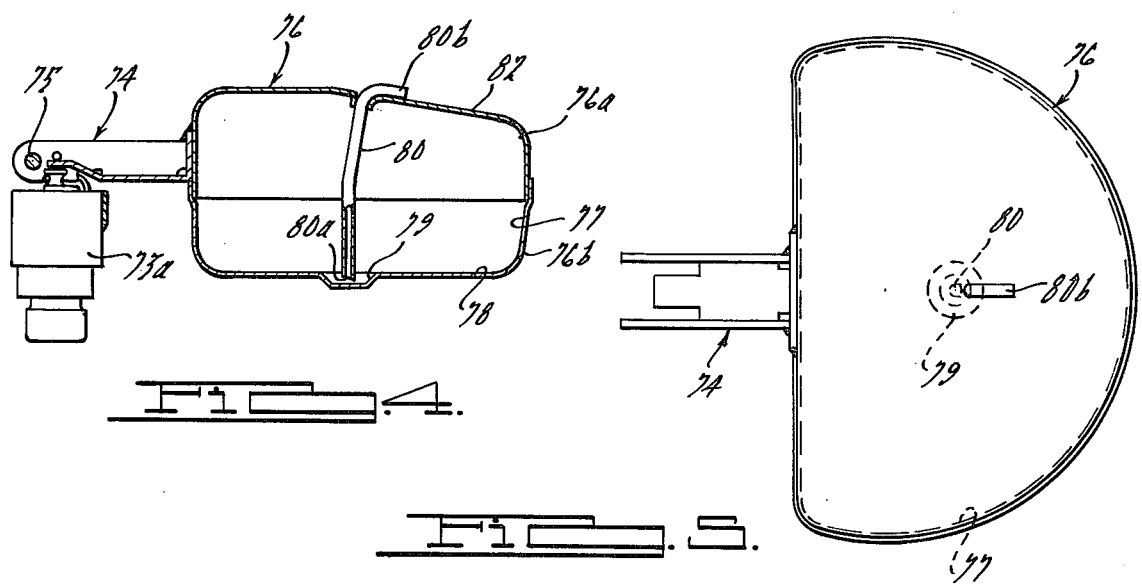

SEPARATOR APPARATUS FOR DIFFERENTIAL HIGH PRESSURE SYSTEMS OF A STIRLING ENGINE

BACKGROUND OF THE INVENTION

An advanced style of Stirling engine, now being considered for automotive applications, employs hydrogen under considerable pressure as the working fluid medium within a closed circuit for heat cycling. Reciprocating elements protrude into such closed circuit for extracting work energy from the heat cycling. Such elements also interconnect with a mechanical means for converting the reciprocal motion into rotary motion for propelling the vehicle. The latter mechanical means requires an oil flow to lubricate interengaging parts for appropriate long life functioning. Thus, the reciprocating elements must pass between two environments, one environment in which oil is freely distributed, preferably under a relatively high oil pressure, and the other environment in which hydrogen is employed as a heat transfer gas at extremely high pressures.

To maintain a separation between such environments and yet allow the reciprocating elements to pass therebetween, a sealing technique is employed which bleeds a small flow of hydrogen gas, from the working circuit, past the seal assembly separating the systems, to pick up oil scraped from the surface of the reciprocating elements by the seal elements. The mixture of gas and oil is then diverted to a remote location where oil is separated and trapped for return to the oil system and gas is reclaimed for return to the gas pressure systems.

A particular problem associated with separation concerns the mechanical means for performing the separation; it must operate under the stress of extremely high hydrogen gas pressure and must also function to promptly and periodically discharge the separated and collected oil back through an oil return line. A direct approach to this periodic discharge of oil is by use of a float valve assembly, the float being buoyant to actuate a valve in response to the attainment of a specific level of separated oil. Conventional float elements are detrimentally affected by the extremely high hydrogen gas pressure and cease to function after a short period of exposure to such environment.

Another problem associated with the separator apparatus is that, in certain applications, the seal assembly must withstand extremely high gas pressure on one side and withstand a relatively high oil pressure at the other side, and yet the seal elements must perform well over considerable cycles under very adverse temperature conditions.

SUMMARY OF THE INVENTION

A primary object of this invention is to provide an improved separator apparatus which will function to maintain separation between a high pressure gas system and an oil system employed within a Stirling type engine, adapted specifically for automotive use.

Another object of this invention is to provide a separator apparatus which will function under extremely high pressure conditions resulting from exposure to a high pressure hydrogen and yet employ a simple float mechanism within said high pressure environment which is not affected by the high pressure environment.

Yet still another object of this invention is to provide a separator apparatus according to the above objects, which further attains a high degree of sealing performance under continuous automotive use, such system having a unique seal assembly surrounding reciprocating elements of the engine; the seal assembly is not detrimentally affected by the high pressure gas system at one side thereof and by the use of high pressure oil at the other side of said seal assembly.

Specific features pursuant to the above objects comprise: (a) A float valve having a float element with a vent tube communicating between the upper surface of the float valve and a small reservoir in the base of the float valve, the expected variation in the high pressure gas system being employed to force collected oil from said float valve during periods when the surrounding gas pressure has dropped momentarily below the gas pressure within the float valve; (b) The employment of a multiple part seal assembly surrounding the reciprocating elements of said engine, the seal assembly having a plurality of cold flowable wiping elements actuated by the high pressure gas system or high oil pressure to perform more effectively in wiping oil from the reciprocating elements.

SUMMARY OF THE DRAWINGS

FIG. 3 is an end view of the apparatus illustrated in FIG. 1;

FIG. 4 is an enlarged reversed view of a portion of the oil separator assembly illustrated in FIG. 3, the view particularly showing the float valve; and FIG. 5 is a plan view of the structure of FIG. 4.

DETAILED DESCRIPTION

Figure 1:
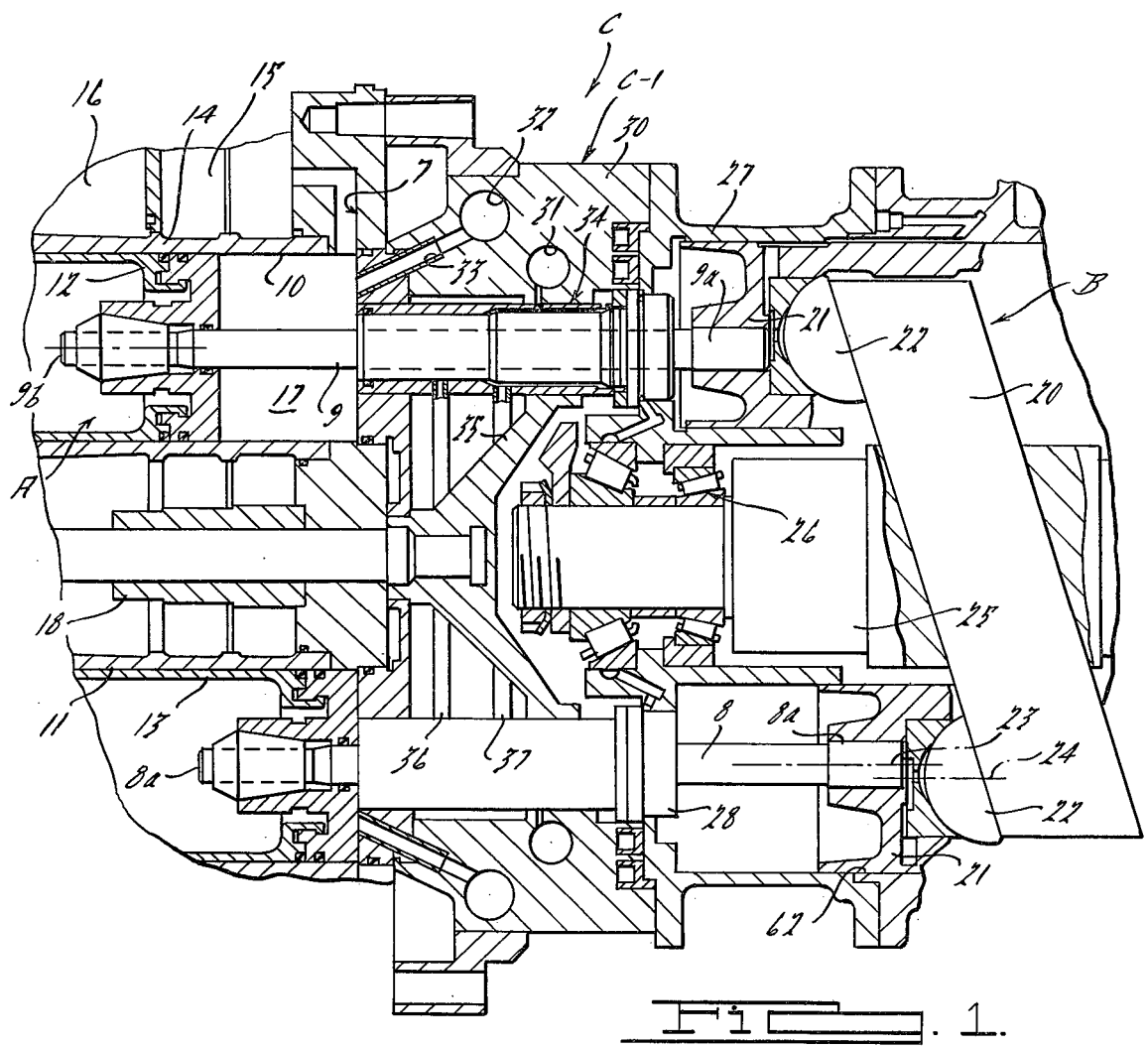
FIG. 1 is a sectional elevational view of a portion of a Stirling engine embodying the principles of this invention, particularly showing the structural interface between the high pressure closed working fluid system and the oil flooding system for the driven means.
Figure 2:
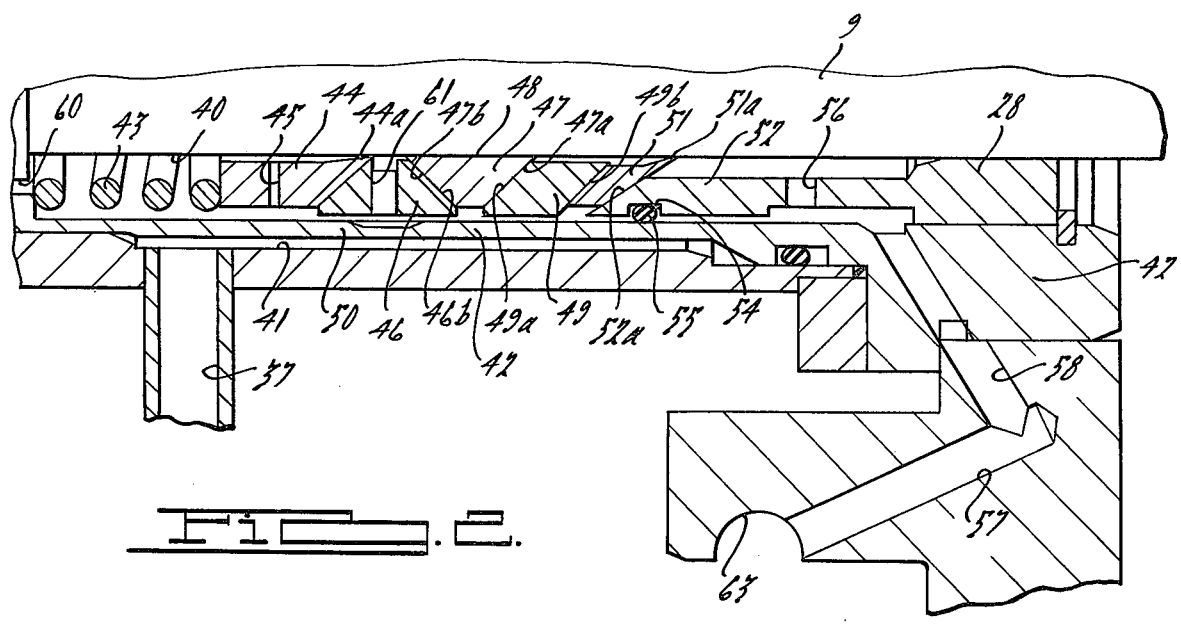
FIG. 2 is an enlarged view of a portion of the seal assembly mounted about the piston rod.

A portion of a regenerative type Stirling engine pertinent to the invention hereof, is shown in FIG. 1. The apparatus illustrated broadly comprises a closed working fluid system A for a high pressure gas, a driven assembly B having a high pressure oil or lubricating system B-1, a dividing assembly C having a control passage block C-1; a separator system D is illustrated in FIG. 3.

The high pressure gas system A comprises a housing 14 defining a plurality of cylindrical spaces or volumes, such as 10 and 11. Double-acting pistons, 12 and 13 divide each respective cylindrical space into a hot chamber (not shown) and a cold or relatively low temperature chamber 17. The chambers are interconnected in a Rinia fashion to permit the pistons to each have said double-action whereby gas is displaced reversibly through a circuit having one hot and one cold chamber and a connecting passage 7 therebetween. The latter passage contains a regenerator 16 and a suitable cooling mechanism 15. Hydrogen (or equivalent gas) is maintained under extremely high pressures in said circuit. Each of the pistons have a piston rod extending coaxially therefrom (here identified as 9 and 8 respectively); one end (8a or 9a) of each piston rod extends into the composite structure of the piston and the other end (8b or 9b) is attached to a crosshead structure 21. The housing 14 has generally predetermined cast walls, with the cylinders arranged in a square pattern about a central space occupied by webbing and interconnecting walls 18.

The driven assembly B comprises a swashplate 20 moved in rotary motion. The piston rods interconnect with the swashplate by way of said crosshead 21 and spherical slider bearings 22. The crossheads reciprocate in cylindrical walls 62. The spherical slider bearings 22 are adapted to slide over the surface of the swashplate. The engine output shaft 25 connects to the central portion of said swashplate and is rotated in response to the rotary movement of said swashplate. The output shaft is supported by a bearing assembly 26 which in turn is supported within housing 27 of the driven assembly B. The piston rods are supported for slidable movement not only by the crosshead and pistons at opposite ends, but also by a bushing 28 carried in the forward wall of said housing 27.

An oil pressure system is maintained within the driven assembly for lubricating the various frictional contacts made therein. Lubricant is conveyed internally by way of passages and sprayed generally through the interior of said housing 27; high pressure oil is also conducted to distributor groove 63 from a pump where it is then conveyed by passages 57–58 to a seal assembly 34. Bushings 28 depend upon a flow of high pressure oil for lubricant to maintain the proper performance during operation.

The dividing assembly C comprises a housing 30, the outer region of which serves to contain a plurality of passages, such as 32 and 31, which provide for various control functions for the high pressure gas circuit. The main portion of the housing 30 is occupied by spaced openings for said piston rods, each surrounded by a seal assembly 34. The central portion is occupied by a bridge structure 35. Since the piston rods extend through and between the high pressure gas system and the high pressure oil system, the seal assembly 34 is employed to maintain an efficient separation between such pressure systems. The seal system 34 comprises a plurality of cold flowable wiping elements 44, 47 and 51 and wedging elements 46, 49 and 52, all arranged in alternating series. The principal wiping element 47 is defined as a sleeve having conically shaped side surfaces 47a and 47b; wedging elements 46 and 49 have complimentary mating surfaces, 49a, which, when urged by a mechanical spring 43 operating on said series, causes said wiping element 47 to compress more tightly about the exterior surface of the piston rod, and maintain an efficient wiping function.

Although the element 37 is capable of removing the major bulk of the oil residing on the surfce of the piston rod, an oil film still remains and must be prevented from entering the high pressure gas system. To this end, two additional pressure actuated elements are employed. One of these elements is 51 having a wiping lip 51a urged more tightly against rod 9 by high pressure oil; as a result a major bulk of the oil residing on the piston rod is removed before engagement by element 47. Wiping element 51 is also urged into tight annular constriction about the piston rod by virtue of conically sloping sidewalls which are engaged by the side walls 49b and 52a of respective wedging elements 49 and 52. High pressure oil works against the outer surface of wiping element 51a urging it even more tightly against the piston rod to assist the cold flow material of element 51 to perform extremely well.

The other element 44 is employed at the opposite of the assembly and has a lip 44a which is formed of cold flow material and thus can be urged more tightly against the piston rod by the wedging action of elements thereagainst. High pressure gas is bled through capillary 60 communicating with the cold chamber 17 of the high pressure system to be present on both sides of the wiping lip 44a by way of communication 45 and 50, allowing gas to reside on the interior as well as exterior side of element 44 and 46. The bled gas exits from the chamber 40 (surrounding the piston rods) through a passage 61 and is then conveyed to a separator system D disclosed more fully in FIG. 3. During its dwell in the seal assembly, the high pressure gas mixes and collects the wiped lubricating oil.

An annular O-ring seal 55 is retained in a groove 54 of elongated element 52 acting as an extension of the bushing 28; element 52 has a passage 56 communicating the radially inner and outer sides thereof.

The mixture of high pressure gas and oil lubricant is conducted from passage 61 to housing 67 of the separator system D by way of passage 64 which combines additional high pressure gas from passage 65 (at a t-coupling 66) immediately prior to entry through opening 68 in the side of housing 67. The housing defines a chamber 69. The upper portion of the housing supports a first means for conveying cleansed or separating gas from chamber 69 which comprises (a) a filter or demisting element 70 for separating out oil droplets from the gas and (b) a passage 71 communicating with the high pressure circuit for return of the separated gas thereto. The lower portion of housing 67 supports a second means comprising an outlet passage 72 and a valve 73 for controlling the ejection of oil collected in the chamber 69 which separated oil is returned to the oil lubricating system. The valve 73 comprises a valve element 73a carried for movement between an open and closed position by way of a lever 74. Lever 74 is adapted for pivotal movement on a fulcrum 75 and is connected to the valve at a point intermediate the fulcrum 75 and a float element 76 whereby, upon upward movement of the float element, valve element 73 is withdrawn from the valve housing to permit flow of oil therethrough.

Float element 76 is defined by interfitting shells 76a and 76b to define a hollow body secured to the end of the lever 74. The hollow body has interior walls 77 converging to a flat interior bse 78 facilitating collection of oil residue. A depression 79 is formed in the base interior wall of the float element to define a zone into which lubricant is concentrated for collection. The interior of such float is closed off from the exterior thereof except for a communicating tube 80 having one end 80a disposed within said zone 79 and disposed below the flat plane of the base 78. The other end 80b of the tube is conformed to the slope of one portion 82 of the float top. The float exterior has portion 82 inclined so that lubricating fluid, caused to migrate outward from the end of the tube 80b, may flow readily down the sides of the float to be collected in chamber 69.

Tube 80 facilitates effective operation of the float under such severe pressure conditions within the separator assembly. The pressure about the float may vary from 20 to 200 atmospheres; during a change in gas pressure there will likely be a pressure differential between the interior and exterior of the float. Such differential pressure facilitates the ejection of any oil vapor that has condensed or oil that remains as a residue within the interior of the float. For example, when the pressure in chamber 69 drops, there is a momentary differential pressure with the pressure inside the float being higher than that on the outside. This differential force causes any fluid in zone 79 to be ejected outward through tube 80 and directed to the collection chamber 69. The float then functions to operate valve 73 permitting the major lubricant collection at the bottom of chamber 69 to be ejected through passage 72 at proper periodic times when the oil level reaches a predetermined amount.

I claim:

1. An assembly for dividing high pressure systems for use in a Stirling type engine having two high pressure fluid systems which must be maintained in substantially independent conditions, comprising:
   (a) a gas pressure system having a closed working fluid circuit which is thermally cycled, said circuit having said fluid under a mean pressure in excess of 20 atmospheres and which means pressure varies between predetermined minimum and maximum levels,
   (b) a reciprocating system for extracting work energy from said closed working fluid circuit and having a portion effective to convert reciprocation to rotary motion,
   (c) an oil lubricating system for coating said reciprocating elements with lubricant and for maintaining said reciprocating system portion bathed with a lubricant,
   (d) a dividing system having wiping elements maintaining sliding contact with said reciprocating system and dividing said gas system from said lubricating system, said separation system having passages continuously bleeding a portion of the gas from said gas pressure system across at least one wiping element to use the gas pressure to create a greater wiping force and to act as a vehicle for carrying away wiped lubricant as a gas/lubricant mixture, and
   (e) a separation system for separating the constituents of said mixture and for returning the separated constituents to their respective systems, said separator system comprising a gas-type chamber, means for introducing a gas oil mixture into said chamber and for withdrawing gas and oil separately from said chamber, said means having a filter to substantially separate said oil from said gas, said means also having a withdrawal port and a port valve operated in conformity with the level of separated oil, said port valve having a float valve element with a hollow interior adapted to concentrate oil condensation to a confined zone, said element also having a siphon passage communicating said zone with the exterior of said float element whereby upon the pressure in said hollow float element being greater than the pressure exterior thereof, the oil in the collected zone will be forced out into said chamber for ejection eventually through said port.

2. The dividing assembly as in claim 1, in which said dividing system comprises a series of annular sealing elements each of which are comprised of cold flow material adapted to change shape in response to wear and sealing forces to provide a continuing type seal against said reciprocating system, said pressure gas system being bled across at least certain of said cold flow elements and said oil lubricating system being bled across at least certain other cold flow elements.

3. The dividing system as in claim 1, in which one of said wiping elements is adapted to limit the amount of oil carried therepast as a film on said reciprocating elements, said limiting element comprising an annular gland having a shrink fit about said reciprocating element and being comprised of cold flow material whereby a mechanical force promoted against said gland will cause said gland to seal more tightly regardless of wear.

4. The dividing system as in claim 1, in which one of said wiping elements is subjected to high pressure oil from that side of the system exposed to the lubrication of said element, and another wiping element is subjected to high pressure gas derived from said gas pressure system, the gas exposure of said one wiping element creates a mixture of gas and lubricant which must be conditioned for return of the separated constituents to their respective systems.

* * * * *